United States Patent [19]

Obara

[11] Patent Number: 4,868,760
[45] Date of Patent: Sep. 19, 1989

[54] WIRE ELECTRIC DISCHARGE MACHINING CONTROL APPARATUS

[75] Inventor: Haruki Obara, Sagamihara, Japan

[73] Assignee: Fanuc Ltd., Minamitsuru, Japan

[21] Appl. No.: 196,012

[22] PCT Filed: Sep. 1, 1987

[86] PCT No.: PCT/JP87/00651
§ 371 Date: Apr. 27, 1988
§ 102(e) Date: Apr. 27, 1988

[87] PCT Pub. No.: WO88/01549
PCT Pub. Date: Mar. 11, 1988

[30] Foreign Application Priority Data

Sep. 6, 1986 [JP] Japan ................... 61-208852

[51] Int. Cl.[4] .................. G06F 15/46; B23P 1/08
[52] U.S. Cl. ................. 364/474.04; 219/69.12; 364/474.29
[58] Field of Search .......... 364/474.04, 474.29; 219/69 R, 69 W, 69 C, 69 G, 69 M

[56] References Cited

U.S. PATENT DOCUMENTS

| 4,518,842 | 5/1985 | Obara | 219/69 M X |
| 4,523,073 | 6/1985 | Gamo et al. | 219/69 W |
| 4,644,124 | 2/1987 | Hori et al. | 364/474.04 X |
| 4,700,314 | 10/1987 | Kinoshita | 364/474.04 |
| 4,703,146 | 10/1987 | Kinoshita | 364/474.04 X |

Primary Examiner—Joseph Ruggiero
Attorney, Agent, or Firm—Staas & Halsey

[57] ABSTRACT

An electric discharge machining control apparatus is provided capable of effecting straight machining, corner machining, and arcuate machining in a stable manner, with improved accuracy. A numerical control unit serves for straight machining under optimum electrical conditions, and controls the on-off operation of relay contacts to and the on-off duty ratio of a pulse oscillator, in order to establish the respective optimum values of a capacitor charging voltage, discharge current, and charge and discharge time read out from a memory in accordance with a calculated corner angle or a calculated radius of a circular arc, machining.

4 Claims, 3 Drawing Sheets

WIRE ELECTRIC DISCHARGE MACHINING CONTROL APPARATUS

BACKGROUND OF THE INVENTION

The present invention relates to an apparatus for controlling a power source of a wire electric discharge machine, and more particularly, to an electric discharge machining control apparatus capable of effecting straight machining, corner machining, and arcuate machining in a stable manner, with improved accuracy.

Presently, many wire electric discharge machines use water as a machining fluid. In this case, a leakage current is produced between a wire electrode and a workpiece in accordance with a gap resistance therebetween, whereby electrolysis is effected. In rough machining, the leakage current does not raise any special problem because electric discharge energy is great. In finish machining, however, if the electric discharge energy for each cycle is large, the machined surface of the workpiece is too rough. In order to minimize surface roughness, therefore, the electric discharge energy must be reduced. If the electric discharge energy is too small, however, stable electric discharge cannot be maintained due to the aforesaid leakage current.

In corner machining or arcuate machining for concave portions, the gap resistance is lower, and more leakage current flows than in straight machining, resulting in too small electric discharge energy which permits unstable electric discharge. Conventionally, therefore, electrical conditions, such as current, supply voltage, on/off time for capacitor charge and discharge in a capacitor discharge circuit, etc., are adjusted during corner machining such that the gap resistance is low, and the leakage current is substantial.

If straight machining is performed under electrical conditions such that stable electric discharge can be obtained and the roughness of the machined surface is satisfactory in the corner machining process for concave portions, the electric discharge energy increases due to less leakage current than in the corner machining, so that the machined surface roughness worsens.

SUMMARY OF THE INVENTION

Accordingly, the object of the present invention is to provide an electric discharge machining control apparatus permitting stable electric discharge in both a straight machining process and a corner or arcuate machining process in finish machining, and ensuring a satisfactory, uniform surface roughness.

In order to achieve the above objects, an electric discharge machining control apparatus according to the present invention includes first memory means for storing electrical conditions responsive to a corner angle; second memory means for storing electrical conditions responsive to the radius of a circular arc; corner angle calculating means for calculating the corner angle at the boundary between adjacent blocks of a numerical control (NC) machining program; radius calculating means for calculating the circular arc radius in response to a circular arc command from the NC machining program; corner machining discrimination means for determining whether corner machining is being performed; and control means operable in response to the result of the determination on the corner machining and the circular arc command, the control means being adapted to change electrical conditions for straight machining over to the electrical conditions read out from the first memory means, in accordance with the calculated corner angle, at the time of the corner machining, and to change the electrical conditions for the straight machining over to the electrical conditions read out from the second memory means, in accordance with the calculated circular arc radius, when the circular arc command is delivered.

According to the present invention, as described above, the straight machining can be performed under optimum electrical conditions, and the optimum electrical conditions for the corner machining can be automatically set in accordance with the corner angle. In both the straight machining and the corner machining, therefore, the electric discharge can be stabilized, the roughness of the machined surface can be minimized, and both straight and corner portions can enjoy uniform surface roughness. Also in the case of arcuate machining, the electrical conditions can be automatically optimized according to the machining circular arc radius. Even in the arcuate machining, therefore, stable electric discharge can be effected, and the machining can be accomplished with satisfactory surface roughness.

DETAILED DESCRIPTION OF THE PREFERRED EMBODIMENTS

Figure 1:
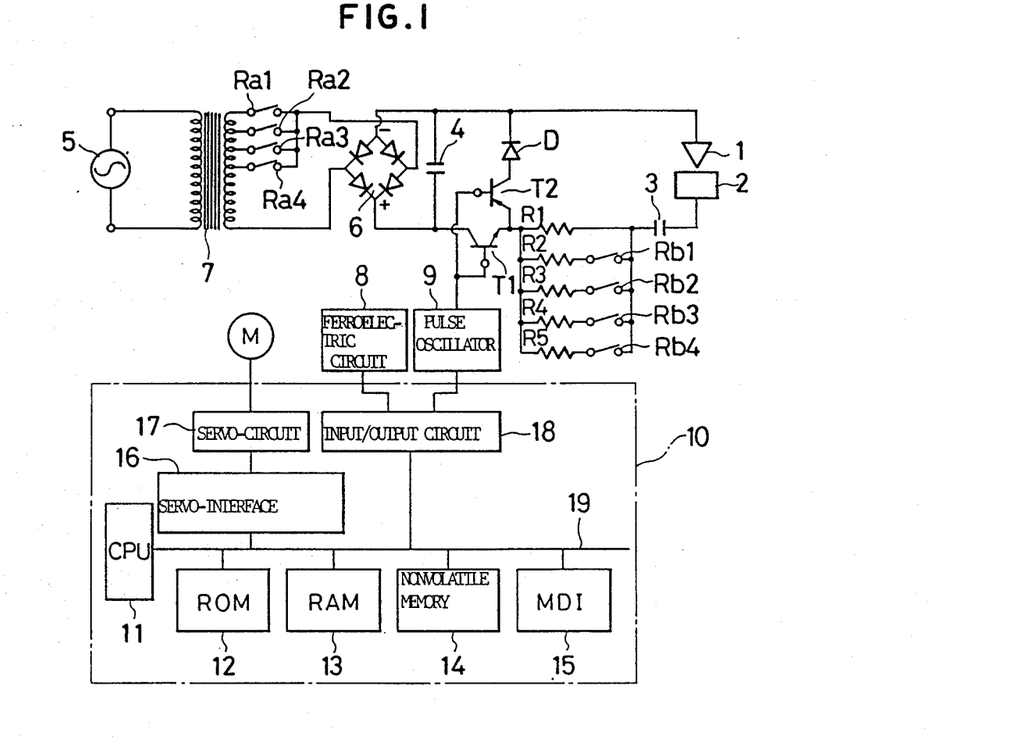
FIG. 1 is a diagram schematically showing a wire discharge machining control apparatus according to one embodiment of the present invention, along with a capacitor discharge circuit with transistors used therewith.

In FIG. 1, reference numerals 1, 2 and 3 denote a wire electrode, a workpiece, and a capacitor for applying electric discharge voltage therebetween, respectively. A charging circuit section of a capacitor discharge circuit, which is composed mainly of an AC power source 5, transformer 7, a rectifier circuit 6, and a first switching transistor T1, serves to variably control the voltage applied to the capacitor 3 by closing any of relay contacts Ra1 to Ra4 arranged between the elements 6 and 7. Numeral 4 denotes a smoothing capacitor. Meanwhile, an electric discharge circuit section of the capacitor discharge circuit comprises a second switching transistor T2, a diode D, and a resistor R1. Series circuits of resistors Ri (i=2 to 5) and relay contacts Rbj (j=1 to 4) are connected in parallel with the resistor R1, whereby the discharge current limiting resistance value is variably controlled by opening or closing the relay contacts Rb1 to Rb4.

The first and second transistors T1 and T2 are composed of a pnp transistor and an npn transistor, respectively. The respective bases of the transistors T1 and T2 are connected to a pulse oscillator 9 (mentioned later) so that when one of the transistors is on, the other is off.

Numeral 10 denotes a numerical control unit for controlling the electric discharge machining power source with the aforementioned construction and an electric discharge machine (not shown) provided with this power source. The numerical control unit 10 comprises a central processing unit (hereinafter referred to as CPU) 11, a ROM 12 for storing a control program, a RAM 13 utilized for tentative storage of data and the like, and a nonvolatile memory 14 for storing a look-up table related to electrical conditions mentioned later, and various parameters and set values. The numerical control unit 10 further comprises a manual data input device 15, a servo-interface 16, and an input/output circuit 18. The elements 12 to 18 are connected to the CPU 11 by means of a bus 19. The servo-interface 16 is connected with servo-circuits (one of which is denoted by numeral 17) for individually driving servomotors (one of which is designated by symbol M) for various axes of the electric discharge machine.

The input/output circuit 18 is connected with a pulse oscillator 9 used to turn on and off the first and second transistors T1 and T2. The on-off duty ratio of pulses generated from the pulse oscillator 9 is controlled by the CPU 11 through the medium of the circuit 18. Also, a ferroelectric circuit 8 is connected to the input/output circuit 18, and individual relays in the ferroelectric circuit 8 are controlled by means of the CPU 11 so that their contacts Ra1 to Ra4 and Rb1 to Rb4 are turned on and off. Thus, the voltage applied to the rectifier circuit 6 and the current limiting resistance value are controlled to control the discharge current.

First, the operation of the capacitor discharge circuit will be described.

If one of the relay contacts Ra1 to Ra4 is turned on, a DC voltage corresponding to the closed relay contact is generated from the output terminal of the rectifier circuit 6. When the first transistor T1 is on, a closed circuit is formed including the positive terminal of the rectifier circuit 6, the first transistor T1, the resistor R1, the capacitor 3, the workpiece 2, the wire electrode 1, and the negative terminal of the rectifier circuit 6. Thus, the capacitor 3 is charged. Subsequently, when the first and second transistors T1 and T2 are turned off and on, respectively, the charging voltage of the capacitor 3 is applied to the gap between the wire electrode 1 and the workpiece 2 via the resistor R1 or other current limiting resistor, the second transistor T2, and the diode D, whereby electric discharge is caused.

Electric discharge machining is accomplished by repeating this operation. The charge and discharge time of the capacitor 3 can be varied by changing the on-off duty ratio of the output pulses of the pulse oscillator 9. Also, the DC voltage delivered from the rectifier circuit 6 and hence, the charging voltage of the capacitor 3, can be varied by selecting the closed relay contact among the relays Ra1 to Ra4 by the ferroelectric circuit 8. By selecting the closed contact among the relay contacts Rb1 to Rb4, moreover, the current limiting resistance value can be varied to control the discharge current. Thus, the electric discharge energy can be controlled by controlling the charge and discharge time, DC current, and discharge current.

In order to effect this control, the on-off duty ratio, DC voltage, and discharge current, which are available for the establishment of optimum electrical conditions for the corner machining and arcuate machining, are previously stored in the nonvolatile memory 14. More specifically, that one of the relay contacts Ra1 to Ra4 and Rb1 to Rb4 is to be turned on, the duty ratio of the pulse oscillator 9 is individually stored in advance in a Table TA in non-volatile memory 14 for use as first memory means, according to the corner angle. Also, the relay contact to be turned on and the duty ratio are individually stored beforehand in a Table TB in nonvolatile memory 14 as second memory means, according to the radius of the circular arc.

Tables TA and TB may be prepared on the basis of these optimum electrical conditions which are obtained empirically. Alternatively, however, the gap resistance may be obtained mathematically so that the individual electrical conditions are determined in accordance with the gap resistance.

Usually, the gap resistance Rg used in the straight finish machining is given by the following equation (1):

$$Rg \approx \rho \cdot (\tfrac{1}{2}\pi l) \cdot \log\{(2h-a)/a\} \quad (1)$$

where $\rho$ is the specific resistance of a machining fluid, l is the thickness of the workpiece, h is an offset amount, and a is the radius of the wire electrode.

Figure 2:
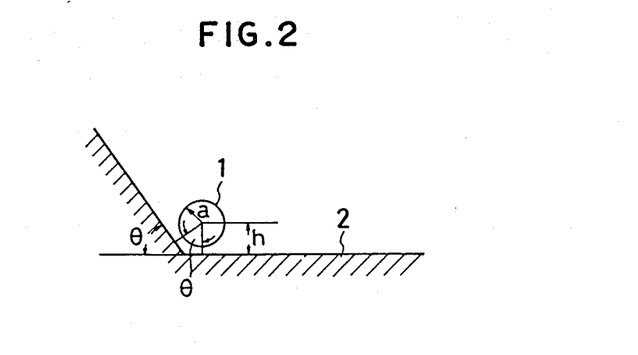
FIG. 2 is a diagram illustrating corner machining.

If the gap resistance used in the machining of a concave portion with a corner angle $\theta$ is Rg', as shown in FIG. 2, the conductance obtained in this case is given by equation (2) as follows:

$$1/Rg' \approx 1/[\rho \cdot (\tfrac{1}{2}\pi l) \cdot \log\{(2h-a)/a\}] + 1/[\rho \cdot \{(h-a)/a\theta l\}] \quad (2)$$

Multiplying equation (1) by equation (2), we obtain $$\begin{aligned} Rg/Rg' &= 1 + [a\theta l/(h-a)] \cdot [\log\{(2h-a)/a\}] \cdot (\tfrac{1}{2}\pi l) \\ &\approx 1 + \{a/(h-a)\} \cdot \log\{(2h-a)/a\} \cdot (\theta/2\pi) \end{aligned} \quad (3)$$

Here if we have $(h-a) = \delta < a$, there is a relation:

$$\log\{(2h-a)/a\} = \log\{(a+2\delta)/a\} \approx 2\delta/a \quad (4)$$

Substituting for equation (3) from equation (4), we obtain $$\begin{aligned} Rg/Rg' &= 1 + \{a/(h-a)\} \cdot (2\delta/a) \cdot (\theta/2) \\ &= 1 + (\theta/\pi) \end{aligned} \quad (5)$$

In the concave corner machining, as compared with the straight machining, the gap resistance is reduced as the corner angle $\theta$ increases, as seen from equation (5), so that the leakage current also varies.

A gap value $\delta$ (=h−a), which is obtained by subtracting the radius a of the wire electrode 1 from the offset amount h, ranges from about 0.005 to 0.010 mm in regular finish machining, and cannot be easily forecast in advance. However, the approximate value of Rg/Rg', which is determined definitely according to the corner angle, is not subject to the influence of the variation of the gap $\delta$, as seen from equation (5), so that the change of the gap resistance for the corner machining can be estimated. Thus, the electrical conditions can be changed so as to compensate the gap resistance by previously setting working conditions for the straight machining, and then determining, on the basis of equation (5), the degree of variation of the gap resistance caused when the machining process is changed from straight machining to corner machining.

In controlling the discharge current, for example, the voltage applied to the gap between the wire electrode 1 and the workpiece 2 for the straight machining process is $V_0 \cdot \{Rg/(r_0+Rg)\}$, if the initial current limiting resistance value and the charging voltage of the capacitor 3 are $r_0$ and $V_0$, respectively. If the gap resistance becomes $Rg'$ at the time of corner machining, however, the voltage applied to the gap becomes $V_0 \cdot \{Rg'/(r_0+Rg')\}$. Thereupon, a current limiting resistance value $r_1$ to make the gap voltage constant is given by $$V_0 \cdot \{Rg/(r_0+Rg)\} = V_0 \cdot \{Rg'/(r_1+Rg')\} \qquad (6)$$

Transforming equation (6), we obtain $$r_1 + Rg' = (Rg'/Rg) \cdot (r_0 + Rg)$$

and therefore, $$\begin{aligned} r_1/r_0 &= (Rg'/Rg) \cdot \{1 + (Rg/r_0)\} - (Rg'/r_0) \\ &= Rg'/Rg \end{aligned} \qquad (7)$$

As seen from equation (7), the gap voltage can be made constant by setting the resistance value $r_1$ so that the ratios $r_1/r_0$ and $Rg'/Rg$ are equal. According to the present embodiment in which only the four resistors R2 to R5 can be turned on and off, however, the value $r_1$ actually cannot be varied finely, so that it is set to a relatively small value. More specifically, there is a relation:

$$r_1/r_0 \leq Rg'/Rg \qquad (8)$$

Substituting for equation (8) from equation (5), we obtain $$\begin{aligned} r_1 &\leq r_0 \cdot (Rg'/Rg) \\ &= r_0 \cdot \{1/(1 + \theta/\pi)\} \end{aligned} \qquad (9)$$

Thus, the required current limiting resistance value $r_1$ for the corner machining process is given by a function of the corner angle $\theta$. In order to obtain a fixed gap voltage by variably controlling the resistance value $r_1$ therefore, it is necessary only that the relay contact to be turned on be stored in Table TA according to the corner angle $\theta$, as mentioned before.

In order to make the gap voltage constant by controlling the DC supply voltage, i.e., the charging voltage of the capacitor 3, moreover, it is necessary only that the capacitor charging voltage for the corner machining process be controlled so that the following equation holds:

$$V_0 \cdot \{Rg/(r_0+Rg)\} = V_1 \cdot \{Rg'/(r_0+Rg')\}$$

where $V_0$ and $V_1$ are capacitor charging voltages for the straight and corner machining processes, respectively.

Accordingly, we obtain:

$$\begin{aligned} V_1/V_0 &= (Rg/Rg') \cdot \{(r_0 + Rg')/(r_0 + Rg)\} \\ &= (Rg/Rg') \cdot [\{(r_0 + Rg) + (Rg'/Rg)\}/\{(r_0/Rg) + 1\}] \end{aligned} \qquad (10)$$

In this case, it is necessary to empirically obtain the value of the ratio $r_0/Rg$ for the straight machining in advance. Usually, the value $r_0/Rg$ is about ½ or less.

Substituting for equation (10) from equation (5), we can obtain the required capacitor charging voltage $V_1$ for the corner machining in accordance with the corner angle $\theta$. The gap resistance for the corner machining of convex portions may be obtained mathematically. In this case, however, the optimum electrical conditions should preferably be determined empirically according to the corner angle $\theta$.

Further, a required duty ratio corresponding to the corner angle $\theta$ is obtained mathematically and empirically, and stored in Table TA in advance. A detailed description of these processes is omitted herein.

Also for the arcuate machining, optimum electrical conditions corresponding to the radius of the circular arc are obtained empirically and stored in Table TB in advance.

The following is a description of a method for obtaining the corner angle $\theta$.

A command data of the numerical control unit basically serves as an instruction for the execution of the straight machining or arcuate machining. In the case of a command for a straight line shown in FIG. 3, a stroke $\Delta X$ ($\Delta x$, $\Delta y$), which starts at the terminal point of a starting vector X ($x_0$, $y_0$), is given by means of a code $G_{01}$. In the case of a command for a clockwise circular arc shown in FIG. 4, a stroke $\Delta X$ ($\Delta x$, $\Delta y$) and an arc center position R (I, J), which starts at the terminal point of a starting vector $X_0$ ($x_0$, $y_0$) and terminates at the center of a circular arc starting at the terminal point of the vector $X_0$, are given by means of a code $G_{02}$. In the case of a command for a counterclockwise circular arc shown in FIG. 5, moreover, an arc center position R (I, J) and a stroke $\Delta X$ ($\Delta x$, $\Delta y$) for the starting vector $X_0$ ($x_0$, $y_0$) are given by means of a code $G_{03}$.

Figure 3:
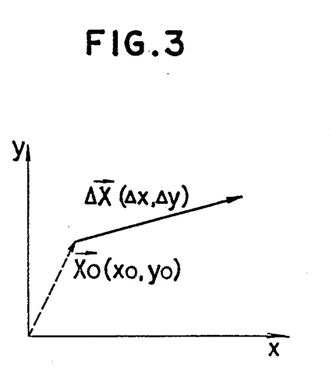
FIG. 3 is a diagram illustrating a command for a straight line.

Accordingly, unit vectors $U_1$ and $U_2$ directed perpendicularly to the right from the starting and terminal points of the straight line, with respect to the advancing direction, are given by equation (11) as follows:

$$\begin{aligned} U_1 &= U_2 \\ &= (\Delta y, -\Delta x)/\sqrt{\Delta x^2 + \Delta y^2} \end{aligned} \qquad (11)$$

Figure 4:
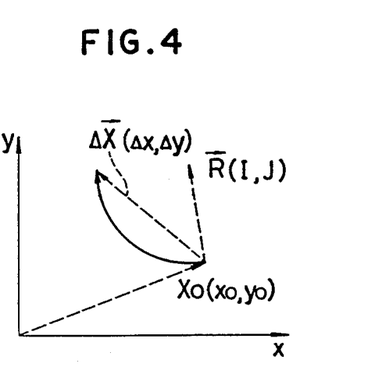
FIG. 4 is a diagram illustrating a command for a clockwise circular arc.

Unit vectors $U_1$ and $U_2$ directed perpendicularly to the right from the starting and terminal points of the clockwise circular arc, with respect to the advancing direction, are given by equations (12) and (13), respectively, as follows:

$$U_1 = (I, J)/\sqrt{I^2 + J^2} \qquad (12)$$

$$U_2 = (I - \Delta x, J - \Delta y)/\sqrt{(I - \Delta x)^2 + (J - \Delta y)^2} \qquad (13)$$

Figure 5:
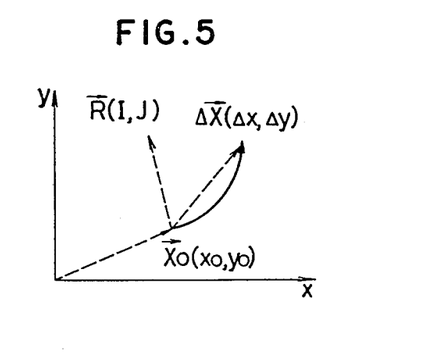
FIG. 5 is a diagram illustrating a command for a counterclockwise circular arc.

Unit vectors $U_1$ and $U_2$ directed perpendicularly to the right from the starting and terminal points of the counterclockwise circular arc, with respect to the advancing direction, are given by equations (14) and (15) as follows:

$$U_1 = (-I, -J)/\sqrt{I^2 + J^2} \tag{14}$$

$$U_2 = (\Delta x - I, \Delta y - J)/\sqrt{(\Delta x - I)^2 + (\Delta y - J)^2} \tag{15}$$

Figure 6:
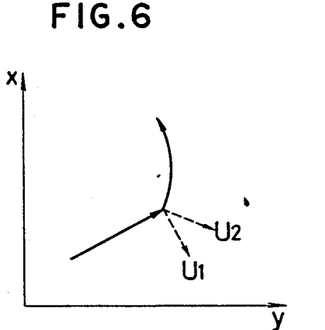
FIG. 6 is a diagram illustrating the calculation of a corner angle at the boundary between a straight-machined portion and an arcuate-machined portion.
Figure 7:
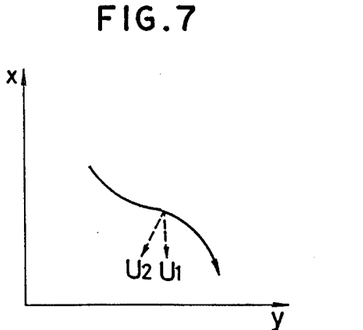
FIG. 7 is a diagram illustrating the calculation of a corner angle at the boundary between arcuate-machined portions.

Thus, if a machining curve for a corner portion is formed of a straight line and a counterclockwise circular arc, as shown in FIG. 6, for example, a unit vector $U_2$ at the terminal point of the straight line is obtained according to equation (11), a unit vector $U_1$ at the starting point of the counterclockwise circular arc is obtained according to equation (14), and the outer product ($U_1 \times U_2$) of these two vectors is calculated. Thereupon, the value of the outer product corresponds to the corner angle, and its sign indicates whether the corner portion is concave or convex. In the concave corner portion machining shown in FIG. 6, for example, the outer product ($U_1 \times U_2$) is positive. For a convex corner portion, on the other hand, the outer product is negative. If the corner portion is composed of a counterclockwise circular arc and a clockwise circular arc, as shown in FIG. 7, a unit vector $U_2$ at the terminal point of the counterclockwise circular arc is obtained according to equation (15), a unit vector $U_1$ at the starting point of the clockwise circular arc is obtained according to equation (12), and the outer product of these two vectors is calculated. Thereupon, the value of the outer product corresponds to the corner angle, and its sign indicates whether the corner portion is concave or convex.

Figure 8:
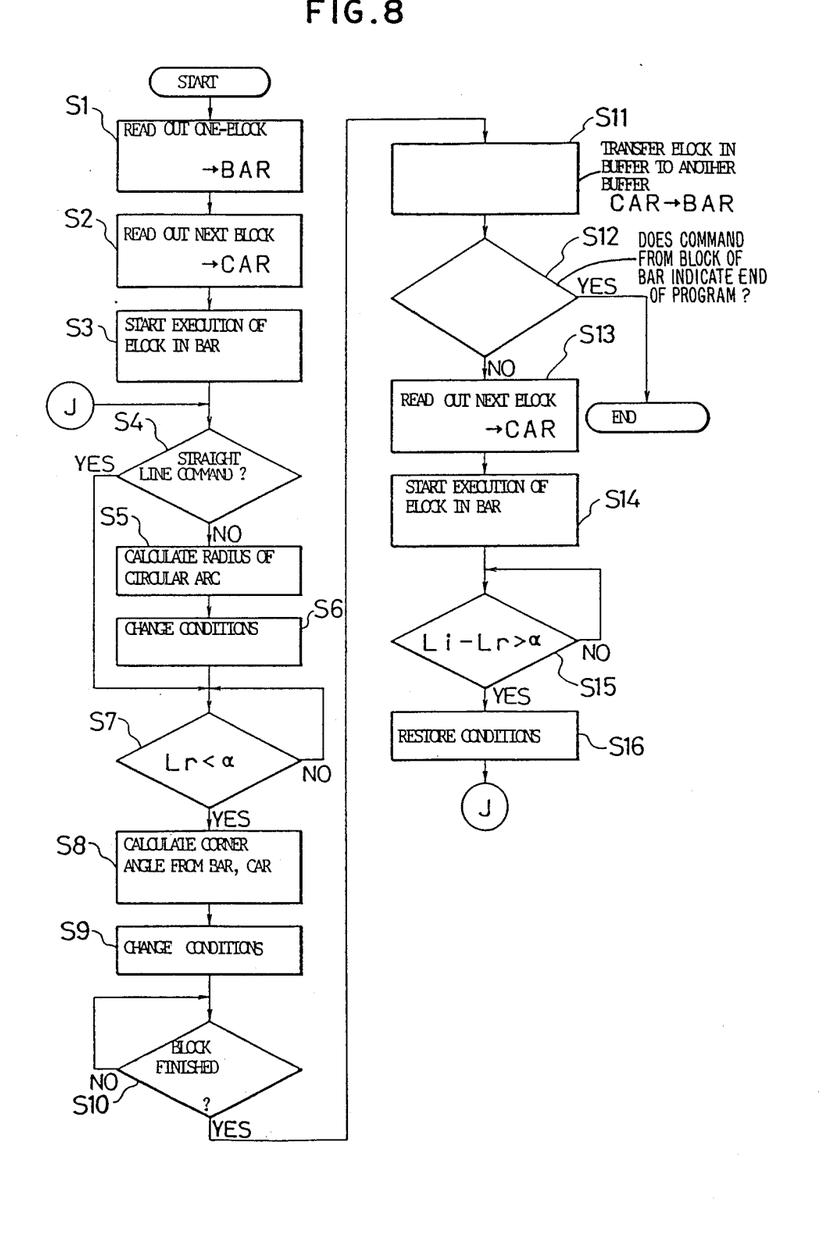
FIG. 8 is an operational flow chart according to the present invention.

Referring now to the flow chart of FIG. 8, the operation of the apparatus according to the present embodiment will be described.

A finish machining mode is established, the electrical conditions (voltage, current, and on/off time) are set to their respective optimum values for the straight machining, and the machining work is started. The CPU 11 reads out one block of an NC machining program stored in the nonvolatile memory 14, and stores it in an execution buffer BAR provided in the RAM 13 (Step S1). Then, the CPU 11 reads out the next block and stores it in a buffer CAR (Step S2), and executes the block stored in the buffer BAR Step S3. Thereafter, the CPU 11 distributes pulses to the individual servo-circuits 17 through the servo-interface 16, thereby driving the individual servomotors. When the machining work is started, the CPU 11 determines whether the command from the block concerned is a straight line command ($G_{01}$) or a circular arc command ($G_{02}$, $G_{03}$) (Step S4). If the command is the straight line command ($G_{01}$), the program proceeds to Step S7. If the command is the circular arc command, on the other hand, radius calculation is performed (Step S5) on the basis of the arc center position R(I, J) which corresponds to the starting vector X($x_0$, $y_0$). Then, the electrical conditions (voltage, current, and on/off time) corresponding to the obtained radius are obtained from Table TB of the nonvolatile memory 14. Subsequently, control outputs corresponding to the electrical conditions are delivered from the input/output circuit 18, so that the individual relays of the ferroelectric circuit 8 are activated, the relay contacts Ra1 to Ra4 and Rb1 to Rb4 are switched, and the duty ratio of the pulse oscillator 9 is changed. Thus, the electrical conditions are changed for the optimum ones for the arcuate machining with the aforesaid radius (Step S6), whereupon the program proceeds to Step S7.

In Step S7, a residual stroke Lr associated with the command from the block concerned is read out from a register for storing the residual stroke Lr, and whether the residual stroke Lr is smaller than a set value $\alpha$, that is, whether corner machining within a region $\alpha$ near the boundary between blocks is started, is determined. If the execution of the corner machining is detected, the unit vector $U_2$ at the terminal point of the present block stored in the buffer BAR and the unit vector $U_1$ at the starting point of the next block (CAR) are obtained on the basis of the command from the present block (BAR) and a command from the buffer CAR for storing the next block, and in accordance with their corresponding ones of equations (12) to (16). Further, the outer product of these unit vectors $U_1$ and $U_2$ is calculated, whether the corner is concave or convex is determined by the sign of the outer product, and the corner angle $\theta$ is obtained in accordance with the absolute value of the outer product (Step S8). The electrical conditions corresponding to the corner angle $\theta$ thus obtained are read out from Table TA, the relay contacts Ra1 to Ra4 and Rb1 to Rb4 are switched in accordance with the corner angle $\theta$, and the duty ratio of the pulse generator 9 is changed. Thus, the conditions are changed for the required voltage, current, and on/off time (Step S9). Then, whether the present block is finished is determined (Step S10). If the end of the present block is detected, the next block stored in the buffer CAR is transferred to the buffer BAR (Step S11). Unless the command from the block stored in the buffer BAR is a command for the end of the program (Step S12), the next block is inputted anew for the buffer CAR in accordance with the NC program (Step S13).

Subsequently, the block stored in the buffer BAR starts to be executed (Step S14), and the residual stroke Lr is subtracted from a stroke $$(= \sqrt{\Delta x^2 + \Delta y^2})$$

specified in the present block. When the differences between these strokes exceeds the set value $\alpha$ (Step S15), the electrical conditions are restored to the electrical conditions for the straight machining (Step S16). More specifically, when the region $\alpha$ near the boundary between the blocks is passed, the electrical conditions are restored from the conditions for the corner machining to the conditions for the straight machining.

Then, the program proceeds again to Step S4. If the currently executed block is for the arcuate machining, the machining is executed after the electrical conditions are changed corresponding to the radius of the circular arc, as mentioned before (Steps S5 and S6). When the residual stroke Lr enters the region $\alpha$ near the boundary between the blocks (Step S7), the corner angle $\theta$ at the boundary region is calculated, and the electrical conditions are changed in accordance with the corner angle (Steps S8 and S9).

Thereafter, the processes of Step S10 and the subsequent steps are executed in the aforementioned manner. Thus, the processes of Steps S4 to S16 are repeated successively until the program ends. When a program end code is stored in the buffer BAR, the processes are finished (Step S12).

I claim:

1. A wire electric discharge machining control apparatus, comprising:
   first memory means for storing electrical conditions responsive to a corner angle;
   second memory means for storing electrical conditions responsive to the radius of a circular arc;
   means for calculating the corner angle at a boundary between adjacent blocks of an NC machining program;
   means for calculating the circular arc radius in response to a circular arc command delivered from the NC machining program;
   corner machining discrimination means for determining whether corner machining is being performed; and
   control means, operable in response to the result of the determination on the corner machining and said circular arc command, for changing electrical conditions for straight machining over to the electrical conditions read out from said first memory means, in accordance with said calculated corner angle, at the time of the corner machining, and for changing the electrical conditions for the straight machining over to the electrical conditions read out from said second memory means, in accordance with said calculated circular arc radius, when said circular arc command is delivered.

2. A wire electric discharge machining control apparatus according to claim 1, further comprising a capacitor charged and discharged for machining, wherein said stored electrical conditions include any of the charging voltage, discharge current, and charge and discharge time of said capacitor.

3. A wire electric discharge machining control apparatus according to claim 1, wherein said control means is operable in response to a finish machining command, to change said electrical conditions only at the time of finish machining.

4. A wire electric discharge machining control apparatus according to claim 2, wherein said control means is operable in response to a finish machining command, to change said electrical conditions only at the time of finish machining.

* * * * *

UNITED STATES PATENT AND TRADEMARK OFFICE
CERTIFICATE OF CORRECTION

PATENT NO. : 4,868,760

DATED : September 19, 1989

INVENTOR(S) : Haruki Obara

It is certified that error appears in the above-identified patent and that said Letters Patent is hereby corrected as shown below:

FRONT PAGE [87], line 2, "Mar. 11, 1988" should be --Mar. 10, 1988--.

FRONT PAGE [57] ABSTRACT, line 7, delete "to"; line 12, "arc, machining." should be --arc, at the time of the corner machining or arcuate machining.--.

Col. 6, line 31, "$\Delta X$" should be --$\Delta \vec{X}$--;

line 32, "X" should be --$\vec{X}$--;

line 34, "$\Delta X$" should be --$\Delta \vec{X}$--;

line 35, "R" should be --$\vec{R}$--;

line 36, "$X_0$" should be --$\vec{X}_0$--;

line 38, "$X_0$" should be --$\vec{X}_0$--;

line 40, "R" should be --$\vec{R}$--;

line 41, "$\Delta X$" should be --$\Delta \vec{X}$--;

line 42, "$X_0$" should be --$\vec{X}_0$--;

line 43, "$U_1$ and $U_2$" should be --$\vec{U}_1$ and $\vec{U}_2$--;

line 49, (equation (11)), "$U_1 = U_2$" should be --$\vec{U}_1 = \vec{U}_2$--;

UNITED STATES PATENT AND TRADEMARK OFFICE
CERTIFICATE OF CORRECTION

PATENT NO. : 4,868,760

DATED : September 19, 1989

INVENTOR(S) : Haruki Obara

It is certified that error appears in the above-identified patent and that said Letters Patent is hereby corrected as shown below:

line 53, "$U_1$ and $U_2$" should be --$\vec{U}_1$ and $\vec{U}_2$--;

line 59, (equation (12)), "$U_1$" should be --$\vec{U}_1$--;

line 61, (equation (13)), "$U_2$" should be --$\vec{U}_2$--;

line 64, "$U_1$ and $U_2$" should be --$\vec{U}_1$ and $\vec{U}_2$--.

Col. 7, line 2, (equation (14)), "$U_1$" should be --$\vec{U}_1$--;

line 5, (equation (15)), "$U_2$" should be --$\vec{U}_2$--;

line 11, "$U_2$" should be --$\vec{U}_2$--;

line 12, "$U_1$" should be --$\vec{U}_1$--;

line 15, "($U_1$ X $U_2$)" should be --($\vec{U}_1$ X $\vec{U}_2$)--;

line 20, "($U_1$ X $U_2$)" should be --($\vec{U}_1$ X $\vec{U}_2$)--;

line 24, "$U_2$" should be --$\vec{U}_2$--;

line 26, "$U_1$" should be --$\vec{U}_1$--;

line 56, "R(I,J)" should be --$\vec{R}$(I,J)--;

line 57, "X" should be --$\vec{X}$--.

Col. 8, line 10, "$U_2$" should be --$\vec{U}_2$--;

line 11, "$U_1$" should be --$\vec{U}_1$--;

UNITED STATES PATENT AND TRADEMARK OFFICE
CERTIFICATE OF CORRECTION

PATENT NO. : 4,868,760

DATED : September 19, 1989

INVENTOR(S) : Haruki Obara

It is certified that error appears in the above-identified patent and that said Letters Patent is hereby corrected as shown below:

line 17, "$U_1$ and $U_2$" should be --$\vec{U}_1$ and $\vec{U}_2$--;

line 39, "stroke" should be --stroke Li--;

line 44, "differences" should be --difference--.

Signed and Sealed this

Second Day of October, 1990

Attest:

HARRY F. MANBECK, JR.

Attesting Officer     Commissioner of Patents and Trademarks